United States Patent Office 3,585,188
Patented June 15, 1971

3,585,188
PROCESS FOR PRODUCING 2'-DEOXYURIDINE
Ryuji Marumoto, Minoo, and Mikio Honjo, Takatsuki, Osaka, Japan, assignors to Takeda Chemical Industries, Ltd., Osaka, Japan
No Drawing. Filed June 16, 1969, Ser. No. 833,780
Int. Cl. C07c 51/52
U.S. Cl. 260—211.5R
6 Claims

ABSTRACT OF THE DISCLOSURE

A process is provided for producing 2'-deoxyuridine. In accordance with the process a lower alkanoyl bromide of at most 7 carbon atoms is reacted with a uridine compound of the formula

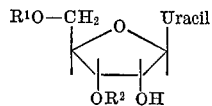

wherein each of $R^1$ and $R^2$ is H or a lower alkanoyl group. The resulting 3',5'-di-O-(lower alkanoyl)-2'-bromo-2'-deoxyuridine is subjected to reduction and subsequent hydrolysis to obtain 2'-deoxyuridine. Also provided is the compound 3',5'-di-O-propionyl-2'-bromo-2'-deoxyuridine, useful as an intermediate in such process.

---

This invention relates to a process for producing 2'-deoxyuridine from a uridine compound and to an intermediate useful in such process. It provides an improved method for the synthetic production of 2'-deoxyuridine from uridine through the reduction of a 2'-halo-2'-deoxyuridine compound.

There have been known a variety of synthetic routes for producing 2'-deoxyuridine from uridine, and among them it has been noted that the most preferable route is the process which goes through an $O^2$:2'-cyclouridine compound as reported, for instance, in Journal of Organic Chemistry, vol. 29, p. 288 (1964) or in Journal of Chemical Society, 1958, p. 4242. However, the known methods require many reaction steps and rather complicated isolation procedures for the intermediates, resulting in a low over-all yield in 2'-deoxyuridine from uridine.

It has now been found by the present inventors that an alkanoyl bromide can be introduced into uridine to afford 3',5'-di-O-alkanoyl-2'-bromo-2'-deoxyuridine in a good yield higher than 80%, and that the bromine atom at 2'-position of the resultant can easily be replaced with hydrogen atom by conventional means of reduction to give the corresponding 3',5'-di-O-alkanoyl - 2' - deoxyuridine, which is then hydrolyzed to afford the 2'-deoxyuridine in a good over-all yield.

The principal object of this invention is therefore to provide an improved process for producing 2'-deoxyuridine from a uridine compound of the general Formula I by means of simplified reaction procedure with a good over-all yield.

For realizing said object, uridine or its lower alkanoate at position(s) 3' and/or 5', represented by the general Formula I:

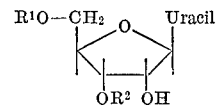

wherein each of $R^1$ and $R^2$ is H or a lower alkanoyl of at most 7 carbon atoms, is allowed to react with a lower alkanoyl bromide of at most 7 carbon atoms to give 3',5'-di-O-(lower alkanoyl)-2'-bromo-2'-deoxyuridine (II).

When uridine or 3'- or 5'-mono-O-alkanoyluridine is used as the starting material, the alkanoyl group corresponding to the alkanoyl bromide employed will find its way into the reaction product, and in any case a 3',5'-di-O-alkanoyl-2'-bromo-2'-deoxyuridine (II) is obtained. It will be appreciated that, depending upon the starting materials used, the 3'- and 5'-alkanoyl groups can be the same or different.

This reaction is generally conducted by bringing the alkanoyl bromide into contact with the uridine compound of the Formula I in a solvent, and advantageously at a temperature of about 50° to about 200° C. The solvent mentioned above may be any inert solvent that will not adversely affect the reaction. For example, use can be made of nitriles (e.g. acetonitrile), carboxylic acid esters (e.g. ethyl acetate), organic phosphate (e.g. trimethyl phosphate), hydrocarbons (e.g. benzene, xylene), ethers (e.g. dioxane, tetrahydrofuran), organic acids (e.g. acetic acid) or the like.

The alkanoyl bromide which is to be employed is, for example, acetyl bromide, propionyl bromide, n-butyryl bromide, n-heptanoyl bromide or the like, and the most preferable is propionyl bromide.

The amount of the alkanoyl bromide and the solvent are chosen with reference to the type of the starting material, the reaction temperature and other factors. Generally speaking, however, it is preferable to employ said alkanoyl bromide in an amount of about 2 moles to about 10 moles and said solvent in an amount of about 100 moles to about 500 moles, relative to the starting uridine compound of the Formula I.

The 3',5'-di-O-(lower alkanoyl)-2'-bromo-2'-deoxyuridine (II) thus produced as subjected to the next reaction, i.e. reduction, either after it has been isolated from the reaction mixture or as it is without being submitted to isolation procedures. To isolate the 2'-bromo-2'-deoxyuridine (II), any of the per se conventional techniques for isolation and purification can be utilized. For example, the solvent is distilled off from the reaction mixture, the residue is dissolved in e.g. ethyl acetate or chloroform, and after washing with water, the solvent is distilled off.

The 3',5'-di-O-alkanoyl-2'-bromo-2'-deoxyuridine (II) obtained as above is then subjected to reduction, affording the corresponding 3',5'-di-O-(lower alkanoyl)-2'-deoxyuridine (III). The reduction is preferably conducted by a per se known catalytic reduction means in a hydrogen atmosphere either at atmospheric pressure or at an elevated pressure up to about 3 atmospheres, at a temperature of from about 10° to about 40° C. in the presence of a suitable catalyst such as Raney nickel, palladium, palladium oxide or the like. The reduction is also realized by the use of a reducing agent such as zinc powder with acetic acid or with a lower alkanol such as methanol or ethanol.

It has generally been noted that such reductive removal of the halogen atom from a halouridine compound is necessarily accompanied by a partial cleavage of the bond between the base and the sugar, resulting in a concomitant production of uracil, and that the uracil thus produced often makes it difficult to isolate the desired 2'-deoxyuridine from the reduction products. It is to be noted, however, that the process of the present invention is free from such difficulty because the reduction product, i.e. 3',5'-di-O-(lower alkanoyl)-2'-deoxyuridine, is far more lipophilic than uracil and this nature enables uracil to be readily removed by the extraction with water from a solution of the reduction products in a water-immiscible organic solvent such as chloroform or ethyl acetate.

Thus produced and preferably purified 3',5'-di-O-(lower alkanoyl)-2'-deoxyuridine (III) is then subjected to mild hydrolysis to afford the final product, i.e. 2'-deoxyuridine. The hydrolysis can be conducted by per se conventional means such as the reaction with methanolic ammonia, sodium alkoxide or the like.

By the process of this invention herein described, the desired end product, 2'-deoxyuridine, can be produced from uridine in simple procedures and in a high over-all yield of about 50% or higher.

Thus produced 2'-deoxyuridine is useful, for example, as the starting material for the synthesis of 5-iodo-2'-deoxyuridine which is of use as a radiosensitizer or as an antiviral agent. Conversion of 2'-deoxyuridine into 5-iodo-2'-deoxyuridine can easily be effected, for example, by the method described in Journal of the American Chemical Society, vol. 77 pages 736 to 738 (1955).

The present invention is further explained by way of the following examples which are not to be construed as limitative but are solely for the purpose of illustration. In the examples as well as in the foregoing disclosures, all percentages are on the weight basis unless otherwise noted, and the abbreviations "g.," "ml.," "l." and "p.p.m." means "gram(s)," "milliliter(s)," "liter(s)" and "parts per million," respectively.

EXAMPLE 1

Propionyl bromide (40 ml.) is added dropwise, taking over about 30 minutes, into a hot suspension of uridine (20 g.) in acetonitrile (1 l.) at 120° C. under vigorous agitation. The mixture is further refluxed for 2 hours, and then the acetonitrile is distilled off. The residue is dissolved in chloroform (600 ml.), and the solution is washed with water (500 ml.). Evaporation of the chloroform gives a colorless crystalline residue, which is recrystallized from ethanol (300 ml.) to obtain 3',5'-di-O-propionyl-2'-bromo-2'-deoxyuridine (24.5 g.) as colorless flakes melting at 133° to 134° C. This product gives positive Beilstein's reaction, and shows the following characteristics:

Nuclear magnetic resonance ($\delta$-value (p.p.m.) at 60 megacycles in $CDCl_3$):
1.2 (2$CH_3$), 2.4 (2—$CH_3$—), 4.4-4.6 ($H_{2'}$, $H_{3'}$), 5.2 (2$H_{4'}$), 5.8 ($H_5$), 6.22 ($H_{1'}$), 7.46 ($H_6$) and 9.7 ($HN_3$).

Elementary analysis.—Calculated for $C_{15}H_{19}O_7N_2Br$ (percent): C, 42.97; H, 4.54; N, 6.69; Br, 19.07. Found (percent): C, 42.94; H, 4.67; N, 6.69; Br, 18.88.

A 5% palladium oxide catalyst carried on barium sulfate (3 g.) is shaken in the atmosphere of hydrogen for 30 minutes, and a solution of 3',5'-di-O-propionyl-2'-bromo-2'-deoxyuridine (20 g.) in methanol (150 ml.) and a solution of anhydrous sodium acetate (12 g.) in water (100 ml.) are thereto added. Catalytic reduction is conducted in the hydrogen stream at atmospheric pressure. After the stoichiometric amount of hydrogen gas has been absorbed, the catalyst is filtered off and the filtrate is concentrated to 50 ml. under reduced pressure. Water (100 ml.) is added and the mixture is extracted twice with chloroform (200 ml. each). The chloroform extracts are combined and the solvent is distilled off under reduced pressure to leave a residue containing 3',5'-di-O-propionyl-2'-deoxyuridine.

The residue is dissolved in 20% methanolic ammonia (300 ml.) and the solution is allowed to stand overnight at 5° C. The reaction mixture is concentrated in vacuo and the residue is crystallized from methanol (40 ml.), to yield 2'-deoxyuridine (7.6 g.) as crystals melting at 160° to 161° C.

EXAMPLE 2

To a suspension of uridine (40 g.) in acetonitrile (3 l.), there is added n-heptanoyl bromide (50 ml.), and the mixture is refluxed under agitation for 2 hours. The acetontrile is distilled off to leave a viscous oil, which is then dissolved in chloroform (600 ml.). The solution is washed with water (400 ml.) and then concentrated.

The concentrate is put in 50% aqueous methanol (200 ml.) together with anhydrous sodium acetate (25 g.) and 5% palladium oxide-barium sulfate catalyst (10 g.) that has previously been activated in a hydrogen stream. Catalytic reduction is conducted in hydrogen at the atmospheric pressure. When the stoichiometric amount (3 l.) of the hydrogen gas was absorbed, the catalyst is filtered off, and the filtrate is concentrated to 200 ml. To the concentrate is added water (200 ml.) and the mixture is extracted with chloroform (400 ml.). The chloroform is then distilled off to leave a residue.

The residue is dissolved in 20% methanolic ammonia, and the solution is kept standing for 20 hours. The methanol is distilled off, and the residue is dissolved in water (500 ml.). The solution is allowed to pass through a column packed with an anion-exchange resin (e.g. "Dowex IX8," borate form (70 ml.), sold by Dow Chemical Co., U.S.A.). The effluent is concentrated under reduced pressure to leave a residue, which is then crystallized from methanol (100 ml.) to give 2'-deoxyuridine (18.2 g.) as crystals melting at 160° C.

EXAMPLE 3

Uridine (20 g.) is suspended in acetonitrile (1 l.), and while the suspension is heated at 120° C. with constant stirring, acetyl bromide (40 ml.) is thereto added dropwise over 20 minutes. The reaction mixture is further boiled for 3 hours, and then the acetonitrile is distilled off. The residue is dissolved in chloroform (1 l.), and the solution is washed with water (1 l.) and concentrated to dryness in vacuo. The procedure yields crude 3',5'-di-O-acetyl-2'-bromo-2'-deoxyuridine (29.7 g.) as colorless powder (Purity: 87%).

The crude powder is then submitted to the catalytic reduction in the same manner as in Example 2, followed by the treatment with 20% methanolic ammonia, to give substantially the same result as in Example 2.

EXAMPLE 4

Uridine (10 g.) is suspended in ethyl acetate (2 l.), followed by the addition of acetyl bromide (40 ml.). The mixture is refluxed under stirring for 5 hours. The ethyl acetate is then distilled off, and the residue is treated in the same manner as in Example 1 to yield 3',5'-di-O-acetyl-2'-bromo-2'-deoxyuridine (14.1 g.) as crude powder (Purity: ca. 80%).

The crude powder is then submitted to the catalytic reduction in the same manner as in Example 2, followed by the treatment with 20% methanolic ammonia, to give substantially the same result as in Example 2.

EXAMPLE 5

Acetyl bromide (20 ml.) is added dropwise to a mixture of 3'-O-acetyluridine (4 g.) and acetonitrile (500 ml.), and the whole mixture is refluxed for 3 hours. The reaction mixture is treated in the same manner as in Example 1 to yield 3',5'-di-O-acetyl-2'-bromo-2'-deoxyuridine (5.8 g.) as crude powder (Purity ca. 60%).

The crude powder is submitted to the same treatment as in Example 2 to give substantially the same result as in Example 2.

What is claimed is:

1. A process for producing 2'-deoxyuridine, which comprises bringing a lower alkanoyl bromide of at most 7 carbon atoms into contact with a uridine compound of the formula

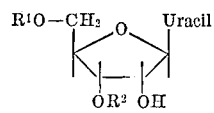

wherein each of $R^1$ and $R^2$ is H or a lower alkanoyl group of at most 7 carbon atoms, under anhydrous conditions at a temperature from about 50° C. to about 200° C.; subjecting the resulting 3',5'-di-O-(lower alkanoyl)-2'-bromo-2'-deoxyuridine to reduction; and hydrolyzing the resulting 3',5'-di-O-(lower alkanoyl)-2'-deoxyuridine.

2. The process according to claim 1, wherein the reduction is a catalytic reduction in hydrogen gas.

3. The process according to claim 1, wherein the lower alkanoyl is propionyl.

4. The process according to claim 1, wherein the starting uridine compound is uridine.

5. The process according to claim 1, wherein the amount of the lower alkanoyl bromide is from about 2 to 10 moles per mole of the starting uridine compound.

6. 3',5'-di-O-propionyl-2'-bromo-2'-deoxyuridine.

References Cited

UNITED STATES PATENTS 3,282,921  11/1966  Verheyden et al. ____ 260—211.5

LEWIS GOTTS, Primary Examiner

J. R. BROWN, Assistant Examiner

UNITED STATES PATENT OFFICE
CERTIFICATE OF CORRECTION

Patent No. 3,585,188                    Dated June 15, 1971

Inventor(s) RYUJI MARUMOTO and MIKIO HONJO

It is certified that error appears in the above-identified patent and that said Letters Patent are hereby corrected as shown below:

The heading of the patent should be corrected to indicate that the patent is entitled to priority based upon Japanese Patent Application No. 42146/1968, filed June 18, 1968.

Signed and sealed this 28th day of December 1971.

(SEAL)
Attest:

EDWARD M. FLETCHER, JR.              ROBERT GOTTSCHALK
Attesting Officer                     Acting Commissioner of Patents

FORM PO-1050 (10-69)